(12) United States Patent
Dixon

(10) Patent No.: US 6,224,253 B1
(45) Date of Patent: May 1, 2001

(54) LIQUID PITCHER WITH MIXING DEVICE

(76) Inventor: Robert A. Dixon, 11770 Stage Rd., Akron, NY (US) 14001

(*) Notice: Subject to any disclaimer, the term of this patent is extended or adjusted under 35 U.S.C. 154(b) by 0 days.

(21) Appl. No.: 09/591,060

(22) Filed: Jun. 9, 2000

(51) Int. Cl.⁷ ..................................................... B01F 7/20
(52) U.S. Cl. .................................... 366/247; 366/325.92
(58) Field of Search .................................. 366/130, 139, 366/241–251, 605, 252, 325.92, 325.93, 330.2; 99/348

(56) References Cited

U.S. PATENT DOCUMENTS

| | | | |
|---|---|---|---|
| 1,101,199 | * | 6/1914 | Legg et al. . |
| 2,269,736 | * | 1/1942 | Rogers . |
| 3,154,123 | * | 10/1964 | Tomlinson . |
| 4,197,018 | * | 4/1980 | Groen, Jr. ............................. 366/248 |
| 4,359,283 | * | 11/1982 | McClellan ............................ 366/247 |
| 4,460,279 | * | 7/1984 | Krasney ................................ 366/247 |
| 4,497,580 | * | 2/1985 | Doyel ................................... 366/251 |
| 4,854,718 | * | 8/1989 | Wang .................................... 366/252 |
| 4,904,834 | * | 2/1990 | Bowen ................................... 99/348 |
| 4,946,286 | * | 8/1990 | Purkapile ............................. 366/247 |
| 5,094,543 | * | 3/1992 | Mursa .................................. 366/247 |
| 5,199,788 | * | 4/1993 | Stallings ............................. 366/605 |
| 5,407,270 | * | 4/1995 | Barile et al. ......................... 366/247 |
| 5,425,579 | * | 6/1995 | Sampson ............................... 366/130 |
| 5,516,208 | * | 5/1996 | Givant .................................... 99/348 |
| 5,549,381 | * | 8/1996 | Hays et al. ............................ 366/139 |
| 5,664,883 | * | 9/1997 | Tomassini ....................... 366/325.93 |
| 5,711,602 | * | 1/1998 | Rohring et al. ....................... 366/251 |

FOREIGN PATENT DOCUMENTS

2187110 * 9/1987 (GB) ................................... 366/247

* cited by examiner

*Primary Examiner*—Charles E. Cooley

(57) ABSTRACT

A liquid pitcher with mixing device for quickly and easily stirring settled liquids or powdered mixes in the pitcher. The liquid pitcher with mixing device includes a container having a side wall, a bottom wall, an open top, a pouring spout disposed at a top of the side wall, and a handle member securely attached to an exterior of the side wall and being essentially diametrically opposed to the pouring spout; and also includes a lid having a main wall and a side wall depending from a perimeter of the main wall and having a pouring slot extending therethrough; and further includes a stirring device including a shaft having a top end and a bottom end with, the top end being rotatably extended through a central portion of the lid and with the shaft extending to near the bottom wall of the container and with the stirring device also including a pair of paddle members removably and securely attached to the shaft, and further including a crank securely attached to the top end of the shaft for rotating the shaft.

9 Claims, 3 Drawing Sheets

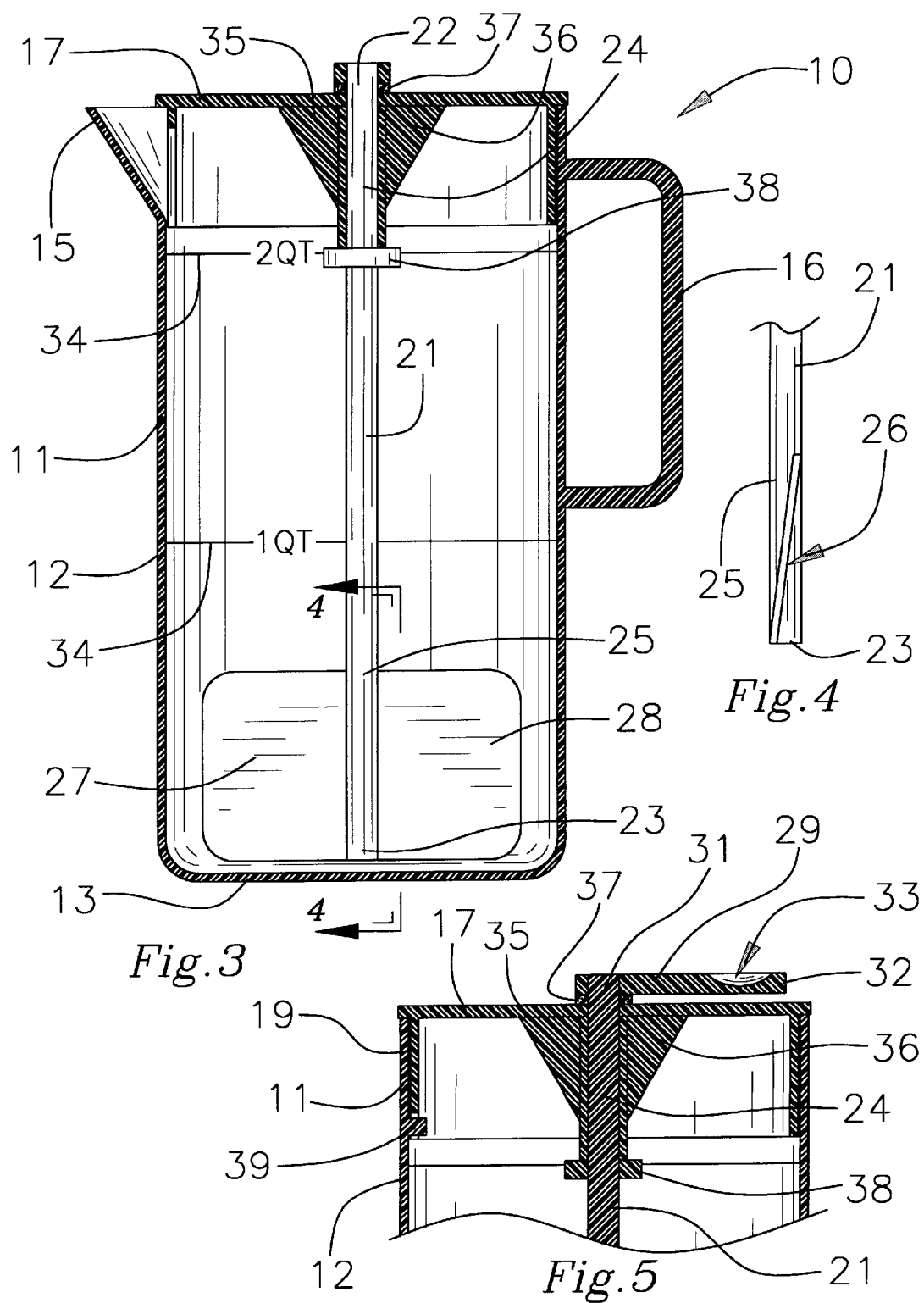

LIQUID PITCHER WITH MIXING DEVICE

BACKGROUND OF THE INVENTION

1. Field of the Invention

The present invention relates to a stirrable pitcher and more particularly pertains to a new liquid pitcher with mixing device for quickly and easily stirring settled liquids or powdered mixes in the pitcher.

2. Description of the Prior Art

The use of a stirrable pitcher is known in the prior art. More specifically, a stirrable pitcher heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,460,279; 4,893,940; 5,284,389; 4,359,283; U.S. Pat. No. Des. 167,259; and U.S. Pat. No. Des. 285,892.

While these devices fulfill their respective, particular objectives and requirements, the aforementioned patents do not disclose a new liquid pitcher with mixing device. The inventive device includes a container having a side wall, a bottom wall, an open top, a pouring spout disposed at a top of the side wall, and a handle member securely attached to an exterior of the side wall and being essentially diametrically opposed to the pouring spout; and also includes a lid having a main wall and a side wall depending from a perimeter of the main wall and having a pouring slot extending therethrough; and further includes a stirring device including a shaft having a top end and a bottom end with, the top end being rotatably extended through a central portion of the lid and with the shaft extending to near the bottom wall of the container and with the stirring device also including a pair of paddle members removably and securely attached to the shaft, and further including a crank securely attached to the top end of the shaft for rotating the shaft.

In these respects, the liquid pitcher with mixing device according to the present invention substantially departs from the conventional concepts and designs of the prior art, and in so doing provides an apparatus primarily developed for the purpose of quickly and easily stirring settled liquids or powdered mixes in the pitcher.

SUMMARY OF THE INVENTION

In view of the foregoing disadvantages inherent in the known types of stirrable pitcher now present in the prior art, the present invention provides a new liquid pitcher with mixing device construction wherein the same can be utilized for quickly and easily stirring settled liquids or powdered mixes in the pitcher.

The general purpose of the present invention, which will be described subsequently in greater detail, is to provide a new liquid pitcher with mixing device having many of the advantages of the stirrable pitcher mentioned heretofore and many novel features that result in a new liquid pitcher with mixing device which is not anticipated, rendered obvious, suggested, or even implied by any of the prior art stirrable pitcher, either alone or in any combination thereof.

To attain this, the present invention generally comprises a container having a side wall, a bottom wall, an open top, a pouring spout disposed at a top of the side wall, and a handle member securely attached to an exterior of the side wall and being essentially diametrically opposed to the pouring spout; and also includes a lid having a main wall and a side wall depending from a perimeter of the main wall and having a pouring slot extending therethrough; and further includes a stirring device including a shaft having a top end and a bottom end with, the top end being rotatably extended through a central portion of the lid and with the shaft extending to near the bottom wall of the container and with the stirring device also including a pair of paddle members removably and securely attached to the shaft, and further including a crank securely attached to the top end of the shaft for rotating the shaft.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new liquid pitcher with mixing device which has many of the advantages of the stirrable pitcher mentioned heretofore and many novel features that result in a new liquid pitcher with mixing device which is not anticipated, rendered obvious, suggested, or even implied by any of the prior art stirrable pitcher, either alone or in any combination thereof.

It is another object of the present invention to provide a new liquid pitcher with mixing device which may be easily and efficiently manufactured and marketed.

It is a further object of the present invention to provide a new liquid pitcher with mixing device which is of a durable and reliable construction.

An even further object of the present invention is to provide a new liquid pitcher with mixing device which is susceptible of a low cost of manufacture with regard to both materials and labor, and which accordingly is then susceptible of low prices of sale to the consuming public, thereby making such liquid pitcher with mixing device economically available to the buying public.

Still yet another object of the present invention is to provide a new liquid pitcher with mixing device which provides in the apparatuses and methods of the prior art some of the advantages thereof, while simultaneously overcoming some of the disadvantages normally associated therewith.

Still another object of the present invention is to provide a new liquid pitcher with mixing device for quickly and easily stirring settled liquids or powdered mixes in the pitcher.

Yet another object of the present invention is to provide a new liquid pitcher with mixing device which includes a container having a side wall, a bottom wall, an open top, a pouring spout disposed at a top of the side wall, and a handle member securely attached to an exterior of the side wall and being essentially diametrically opposed to the pouring spout; and also includes a lid having a main wall and a side wall depending from a perimeter of the main wall and having a pouring slot extending therethrough; and further includes a stirring device including a shaft having a top end and a bottom end with, the top end being rotatably extended through a central portion of the lid and with the shaft extending to near the bottom wall of the container and with the stirring device also including a pair of paddle members removably and securely attached to the shaft, and further including a crank securely attached to the top end of the shaft for rotating the shaft.

Still yet another object of the present invention is to provide a new liquid pitcher with mixing device that allows the user to remix liquids without the user spilling the liquid while mixing with a spoon.

Even still another object of the present invention is to provide a new liquid pitcher with mixing device that is convenient and easy to set up.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention.

FIG. 4 is a detailed side elevational view of the bottom portion of the shaft of the present invention.

FIG. 5 is a detailed cross-sectional view of the top portion of the container and the stirring device of the present invention.

DESCRIPTION OF THE PREFERRED EMBODIMENT

Figure 1:
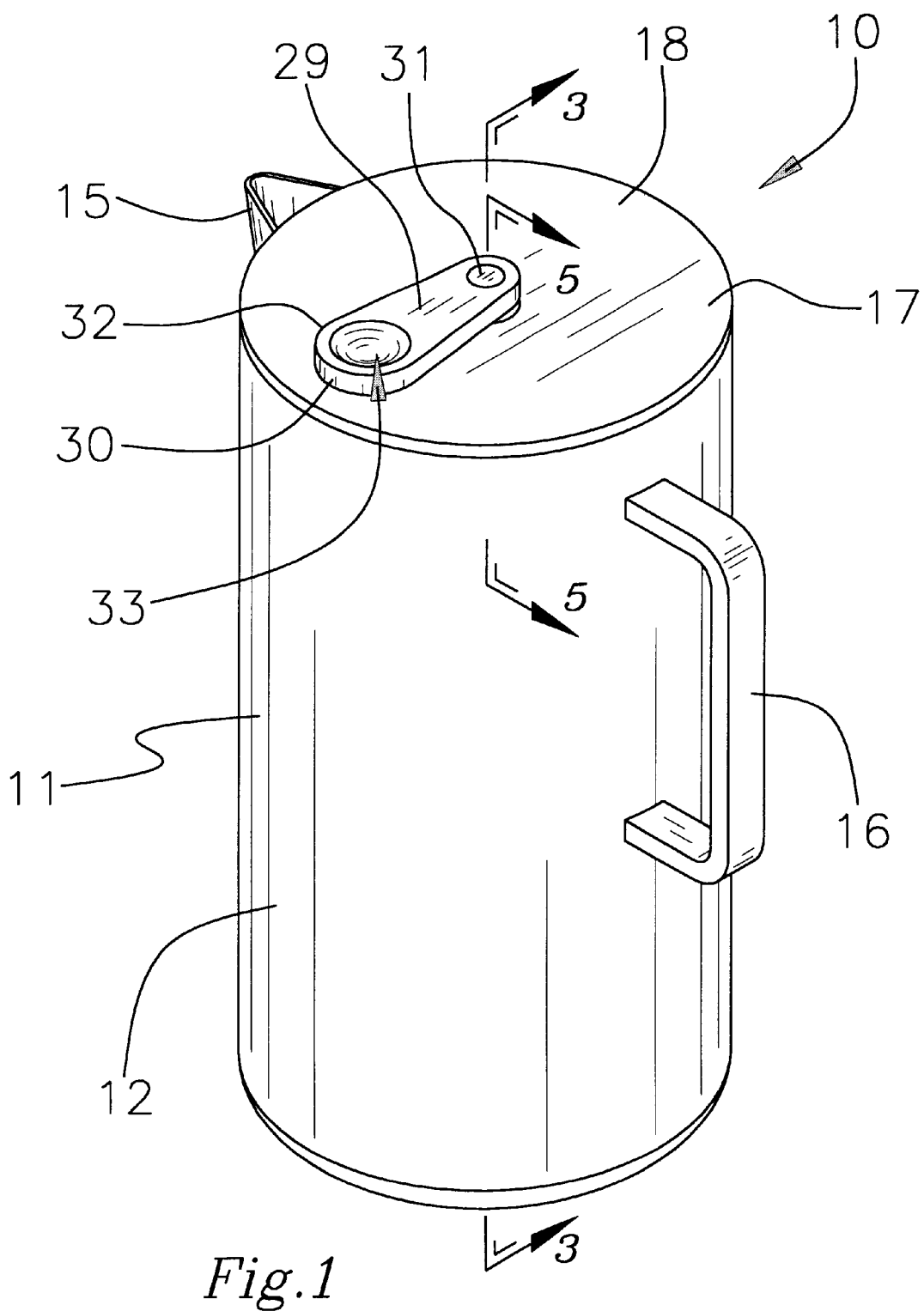
FIG. 1 is a perspective view of a new liquid pitcher with mixing device according to the present invention.
Figure 2:
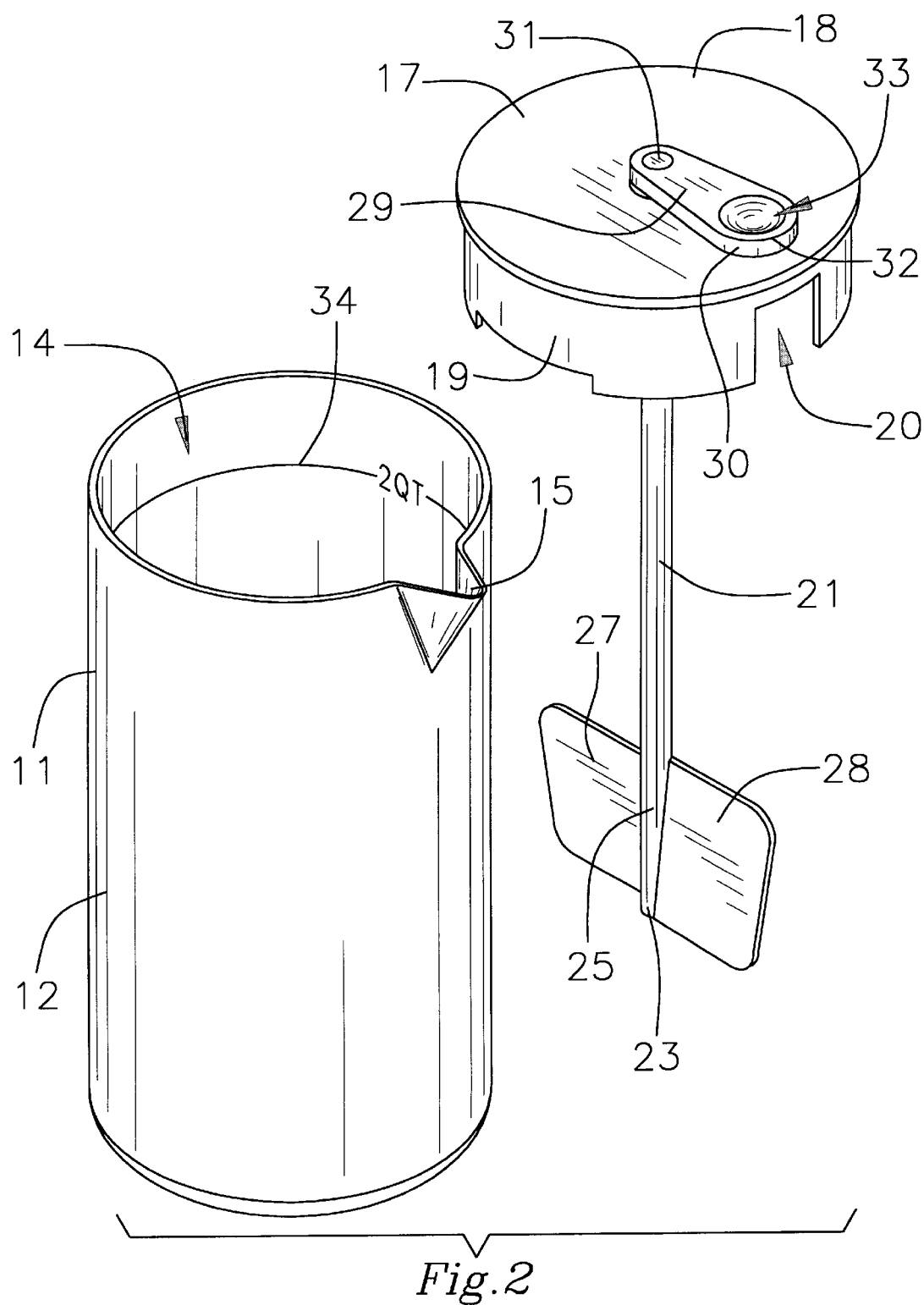
FIG. 2 is an exploded perspective view of the present invention.

With reference now to the drawings, and in particular to FIGS. 1 through 5 thereof, a new liquid pitcher with mixing device embodying the principles and concepts of the present invention and generally designated by the reference numeral 10 will be described.

As best illustrated in FIGS. 1 through 5, the liquid pitcher with mixing device 10 generally comprises a container 11 having a side wall 12, a bottom wall 13, an open top 14, a pouring spout 15 disposed at a top of the side wall 12, and a handle member 16 securely and conventionally attached to an exterior of the side wall 12 and being essentially diametrically opposed to the pouring spout 15. A lid 17 is removably disposed upon the top 14 of the container 11 and has a main wall 18 and a side wall 19 conventionally depending from near a perimeter of the main wall 18 and having a pouring slot 20 extending therethrough with the main wall 18 overlapping the side wall 19.

A stirring device includes a shaft 21 having a top end 22 and a bottom end 23 with the top end 22 being rotatably extended through a central portion of the lid 17. The shaft 21 extends to near the bottom wall 13 of the container 11. The stirring device also includes a pair of paddle members 27,28 removably and securely attached to the shaft 21, and further includes a crank 29 securely and conventionally attached to the top end 22 of the shaft 21 for rotating the shaft 21. The shaft 21 also includes longitudinal slots 26 extending therein and along a bottom portion 25 and through the bottom end 23 thereof with each of said longitudinal slots 25 being adapted to receive an end portion of a respective paddle member 27,28. Each longitudinal slot 25 is angled relative to a longitudinal axis of the shaft 21. The paddle members 27,28 are angled relative to the longitudinal axis of the shaft 21 with the paddle members 27,28 being angled relative to one another and lying in separate planes which are arranged in generally an X-shaped pattern. The stirring device also includes brace members 35,36 which are securely and conventionally mounted about a top portion 24 of the shaft 21 and held in place with a retaining member 38 which is securely and conventionally attached and molded to the shaft 21 below the brace members 35,36. Each of the brace members 35,36 is essentially a wing-like triangular-shaped member. The crank 29 is essentially an oblong plate-like member 30 having a narrow end 31 securely and conventionally attached to the top end 22 of the shaft 21 and being spaced from the main wall 18 of the lid 17 with a spacer member 37. The oblong plate-like member 30 includes a top side which has a recessed portion 33 extending therein near an enlarged end 32 of the plate-like member 30 with the recessed portion 33 being adapted to receive a finger of a user for grasping and turning the crank 29.

In use, the user fills the container 11 with liquid such as water to one of the markings 34 disposed upon the inner side of the side wall 12 of the container 11 with the markings 34 designating a particular volume of liquid within the container 11 such as one quart or two quarts, and adds a mix usually in the form of a powder or concentrated frozen liquid in the container 11 and places and aligns the lid 17 upon the container using a lid alignment member 39 which is securely disposed upon and extends from the inner side of the side wall 12 with the shaft 21 and paddle members 27,28 being rotatably disposed inside the container 11. The user then turns the crank 29 to rotate the paddle members 27,28 which essentially stirs the mix with the liquid until the mix is completely dissolved in the liquid.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A liquid pitcher with mixing device comprising:
   a container having a side wall, a bottom wall, an open top, a pouring spout disposed at a top of said side wall, and a handle member securely attached to an exterior of said side wall and being essentially diametrically opposed to said pouring spout;
   a lid having a main wall and a side wall depending from near a perimeter of said main wall and having a pouring slot extending therethrough with said main wall overlapping said side wall;
   a stirring device including a shaft having a top end and a bottom end, said top end being rotatably extended through a central portion of said lid, said shaft extending to near said bottom wall of said container, said stirring device also including a pair of paddle members removably and securely attached to said shaft, and further including a crank securely attached to said top end of said shaft for rotating said shaft; and
   said shaft also including longitudinal slots extending therein and along a bottom portion and through said bottom end thereof and each being adapted to receive an end portion of a respective said paddle member.

2. A liquid pitcher with mixing device as described in claim 1, wherein each said longitudinal slot is angled relative to a longitudinal axis of said shaft.

3. A liquid pitcher with mixing device as described in claim 1, wherein said paddle members are angled relative to the longitudinal axis of said shaft.

4. A liquid pitcher with mixing device as described in claim 1, wherein said paddle members are angled relative to one another and lie in separate planes which are arranged in generally an X-shaped pattern.

5. A liquid pitcher with mixing device as described in claim 1, wherein said stirring device also includes brace members which are securely mounted about a top portion of said shaft and held in place with a retaining member which is securely attached to said shaft below said brace members.

6. A liquid pitcher with mixing device as described in claim 5, wherein each of said brace members is essentially a wing-like triangular-shaped member.

7. A liquid pitcher with mixing device as described in claim 1, wherein said crank is essentially an oblong plate-like member having a narrow end securely attached to said top end of said shaft and being spaced from said main wall of said lid with a spacer member.

8. A liquid pitcher with mixing device as described in claim 7, wherein said oblong plate-like member includes a top side which has a recessed portion extending therein near an enlarged end of said plate-like member, said recessed portion being adapted to receive a finger of a user.

9. A liquid pitcher with mixing device comprising:
   a container having a side wall, a bottom wall, an open top, a pouring spout disposed at a top of said side wall, and a handle member securely attached to an exterior of said side wall and being essentially diametrically opposed to said pouring spout, said container further having markings disposed upon an inner side of said side wall thereof inside said container, each of said markings designating a particular volume of liquid within said container, said container also having a lid alignment member securely attached to and extending from said inner side of said side wall thereof;
   a lid having a main wall and a side wall depending from near a perimeter of said main wall and having a pouring slot extending therethrough with said main wall overlapping said side wall; and
   a stirring device including a shaft having a top end and a bottom end, said top end being rotatably extended through a central portion of said lid, said shaft extending to near said bottom wall of said container, said stirring device also including a pair of paddle members removably and securely attached to said shaft, and further including a crank securely attached to said top end of said shaft for rotating said shaft, said shaft also including longitudinal slots extending therein and along a bottom portion and through said bottom end thereof and each being adapted to receive an end portion of a respective said paddle member, each said longitudinal slot being angled relative to a longitudinal axis of said shaft, said paddle members being angled relative to the longitudinal axis of said shaft, said paddle members being angled relative to one another and lying in separate planes which are arranged in generally an X-shaped pattern, said stirring device also including brace members which are securely mounted about a top portion of said shaft and held in place with a retaining member which is securely attached to said shaft below said brace members, each of said brace members being essentially a wing-like triangular-shaped member, said crank being essentially an oblong plate-like member having a narrow end securely attached to said top end of said shaft and being spaced from said main wall of said lid with a spacer member, said oblong plate-like member including a top side which has a recessed portion extending therein near an enlarged end of said plate-like member, said recessed portion being adapted to receive a finger of a user.

* * * * *